(12) United States Patent
Turner et al.

(10) Patent No.: US 7,239,437 B2
(45) Date of Patent: Jul. 3, 2007

(54) REDUCTION OF OPEN LOOP JITTER AND CONTROL LOOP STABILIZATION OF A TORSIONAL HINGED DEVICE BY STRUCTURAL OPTIMIZATION

(75) Inventors: Arthur Monroe Turner, Allen, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 127 days.

(21) Appl. No.: 11/136,347

(22) Filed: May 24, 2005

(65) Prior Publication Data

US 2006/0012843 A1    Jan. 19, 2006

Related U.S. Application Data

(60) Provisional application No. 60/587,519, filed on Jul. 13, 2004.

(51) Int. Cl.
*G02B 26/08* (2006.01)

(52) U.S. Cl. .................. 359/224; 359/198; 359/199; 359/225; 359/900; 310/311

(58) Field of Classification Search .............. None
See application file for complete search history.

(56) References Cited

U.S. PATENT DOCUMENTS 6,924,914 B2 *    8/2005    Kato et al. .................. 359/224

* cited by examiner

*Primary Examiner*—James Phan
(74) *Attorney, Agent, or Firm*—William B Kempler; W. James Brady, III; Frederick J. Telecky, Jr.

(57) ABSTRACT

Apparatus and methods for removing jitter and stabilizing the feed back system of a torsional hinged device with minimal changes to the system. The stabilization is accomplished by spatially isolating the pivoting mirror structure from all drive, support and packaging structures to reduce air drag. The mirror structures may be further stabilized by tailoring the drive mechanism and the position of the mechanism to produce substantially pure rotational drive torque on the mirror.

13 Claims, 6 Drawing Sheets

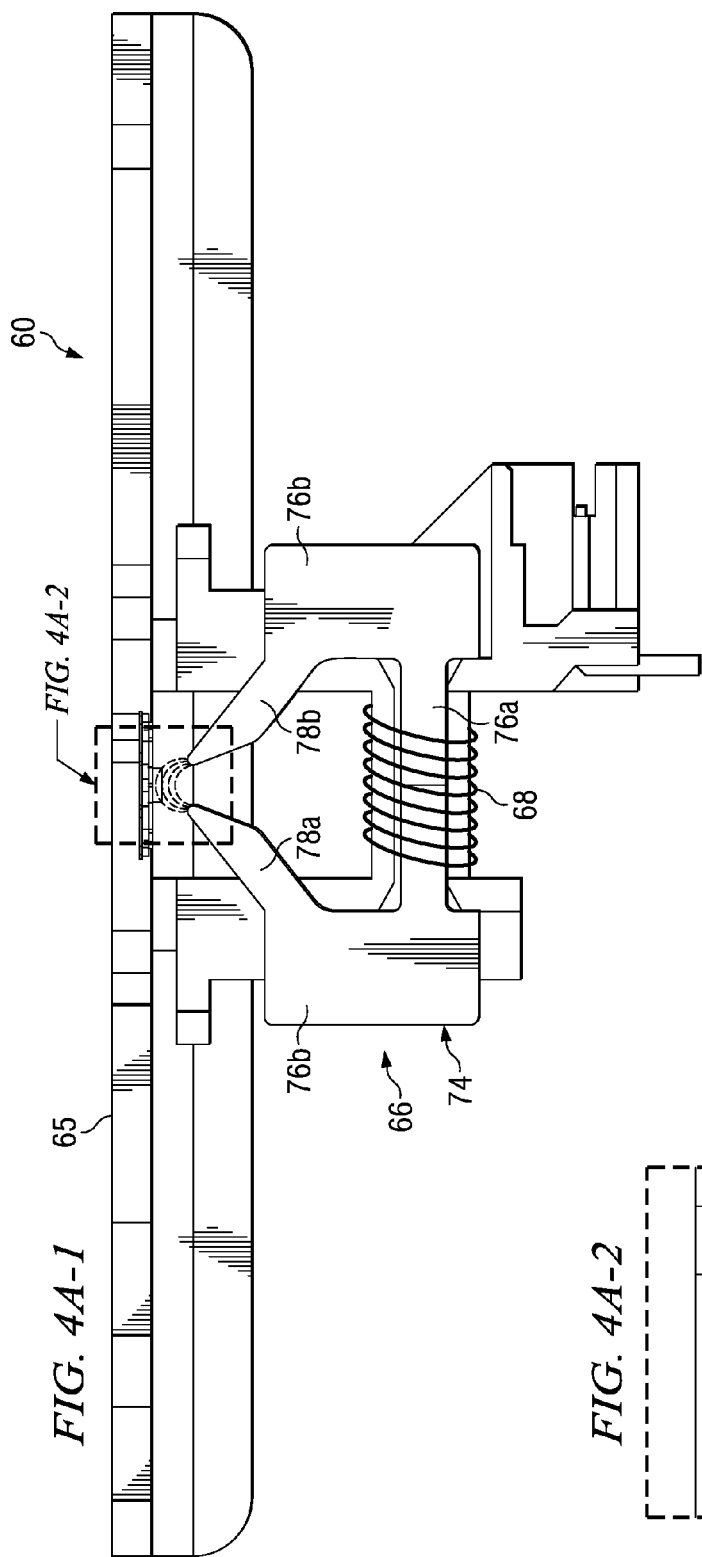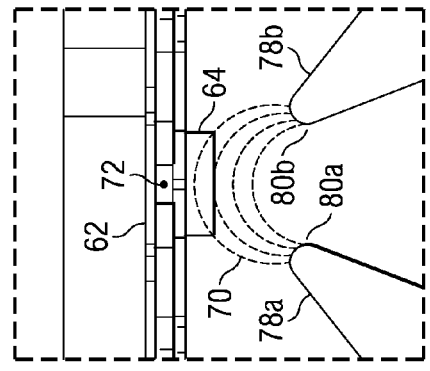

REDUCTION OF OPEN LOOP JITTER AND CONTROL LOOP STABILIZATION OF A TORSIONAL HINGED DEVICE BY STRUCTURAL OPTIMIZATION

This application claims the benefit of U.S. Provisional Application No. 60/587,519, filed on Jul. 13, 2004, entitled Reduction Of Open Loop Jitter And Control Loop Stabilization Of MEMS Mirrors By Optimizing Core And Package Geometry, which application is hereby incorporated herein by reference.

TECHNICAL FIELD

The present invention relates to a scanning apparatus and to methods and apparatus for stabilizing the velocity profile of such a scanning apparatus. More particularly, the present invention relates to methods and apparatus for stabilizing the velocity profile of a sweeping light beam used in printing and display devices.

BACKGROUND

Torsional hinged or galvanometer type mirrors provide an inexpensive alternate mechanism to rotating polygon shaped mirrors that generate a sweeping light beam suitable for use with visual displays and high speed printers. As will be appreciated by those skilled in the art, in order to print high quality images with a laser printer, the mirror which scans or sweeps the light beam across a light sensitive medium (such as a rotating drum) must scribe or follow the same path at the same velocity and with the same period for each scan or sweep. Failure to closely repeat the position and time for each scan or sweep is referred to as jitter. Torsional hinged or galvanometer mirrors are high Q resonant scanning oscillators with mirror tip speeds within a factor of 10 of the speed of sound. At these speeds, air resistance is the primary energy dissipation mechanism (drag) on the mirror. Air currents or air density fluctuations in the vicinity of the rotating mirror produce low frequency variations in the rotational amplitude. These amplitude variations create low frequency jitter in the scan beam that in turn produces artifacts in high quality printed images. A beam position sensor can be used to generate error signals proportional to the magnitude of the jitter and/or deviations from the desired velocity profile. These error signals in conjunction with a PI (Proportional plus Integral) or similar controller determine the power to the drive mechanism to suppress the amplitude variations and reduce the variations in the beam sweep. Unfortunately, galvanometer or torsional hinged mirrors have vibrational modes other than the oscillation or rotational mode that produces the scanned beam. Therefore, if the control or feedback loop produces changes in the frequency components of the drive mechanism that excites the mirrors non-rotational modes, then undesirable vibrational modes can be excited. The excitation of some vibrational modes can produce beam motion, which can in turn produce an even larger error signal. The feed back loop may then try to suppress this larger signal by further increasing the drive correction, which further exacerbates the error. This unstable process amplifies or pumps the undesirable mode and the controlled system may oscillate or even diverge. In practice, this problem is observed as an oscillation in the error signal and mirror jitter at high proportional loop gain settings.

Therefore, a torsional hinged scanning system would be advantageous. Such a system with rotational amplitude stabilization would be even more advantageous if it can be implemented with minimal changes to the existing structure of the operating system.

SUMMARY OF THE INVENTION

A solution to the jitter and stability problems discussed above is addressed by the present invention by first tailoring the position and geometry of drive components, packaging, and any surrounding structure to avoid air drag on the rotating drive. More specifically, all adjacent structure(s) that is not part of the rotating torsional hinged device itself are selected and arranged so that the "Q" of the assembled device is substantially the same as if the device was located at an infinite distance from the drive source and all associated packaging. For example, the torsional hinged device should be mounted with an open as possible structure, but that at the same time can provide stiff support to the rotating device.

Second, the drive mechanism and geometry is tailored so that torque applied to the pivoting structure is substantially pure rotational torque (i.e. with minimal non-rotating torque components).

To accomplish this, the invention comprises methods for stabilizing the rotational motion of a torsional hinged system such as a torsional hinged mirror. The methods and apparatus of the system includes an oscillating assembly comprising a pivoting device, such as for example a mirror, supported by torsional hinges that extend along a pivot axis. A drive mechanism responsive to a drive signal causes oscillations of the pivoting device about the pivot axis at a selected speed and amplitude, which determines a selected velocity profile.

However, according to the present invention, the system structures and surrounding structures are tailored and spaced away from the pivoting structure to reduce air drag and maintain a "Q" value within 10% of the maximum "Q" value of the system. The maximum "Q" value is determined by measuring Q with all surrounding structures separated from or removed far enough away so that no further increase in Q is observed with further separation. Further, according to one embodiment, the magnetic core of a magnetic drive system is tailored so that the flux lines acting on the permanent magnet of the magnetic drive mechanism are substantially uniform. That is, there are substantially no gradients in the magnetic field acting on the permanent magnet. Sensors are then positioned to periodically monitor the position of the pivoting device and generate signals representative of the monitored position. Control or feedback circuitry is connected to the sensor to receive the position signals and to determine the parameters of a drive signal that will maintain the oscillations of the pivoting device at the speed and amplitude of the selected velocity profile. The control circuitry provides the drive signal parameters to a power source, which in turn generates a drive signal having the determined parameters.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4A and 4B, represent a front view and a partial perspective view of a presently available arrangement of a resonant scanning mirror and a power efficient magnetic core drive mechanism in close proximity to the mirror;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
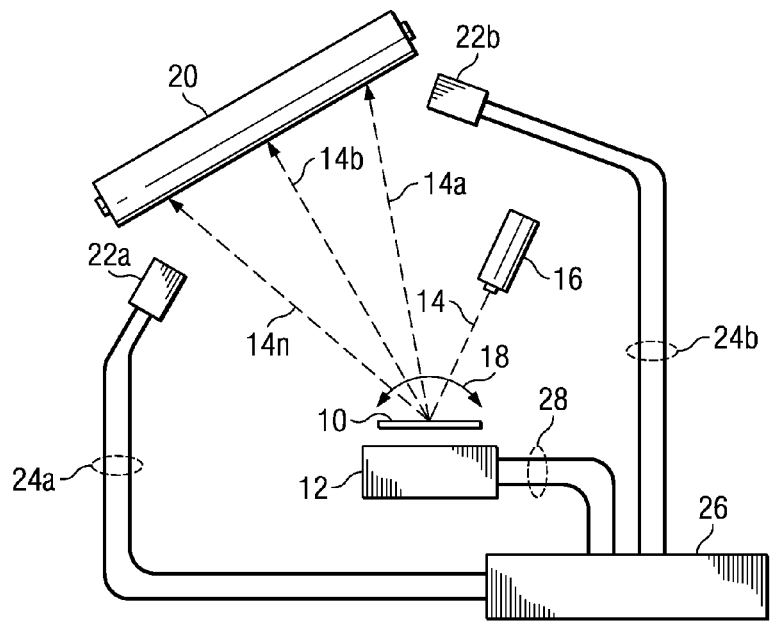
FIG. 1 is a simplified diagram of a torsional hinged scanning system, such as a scanning mirror that can benefit from the teachings of the present invention.
Figure 6A:
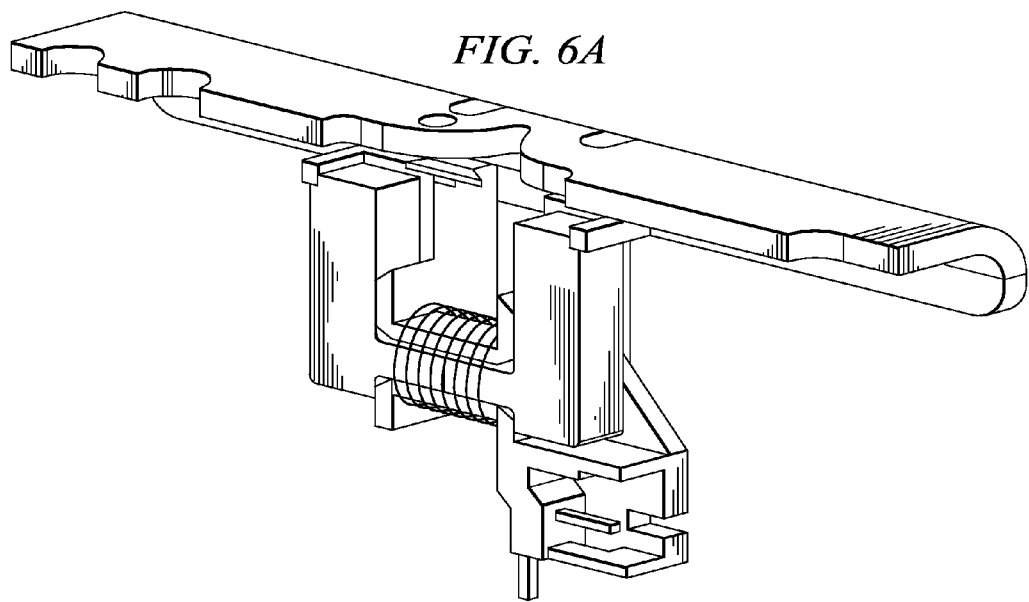
FIGS. 6A and 6B illustrate a front view and a perspective view of another embodiment of the invention.
Figure 6B:
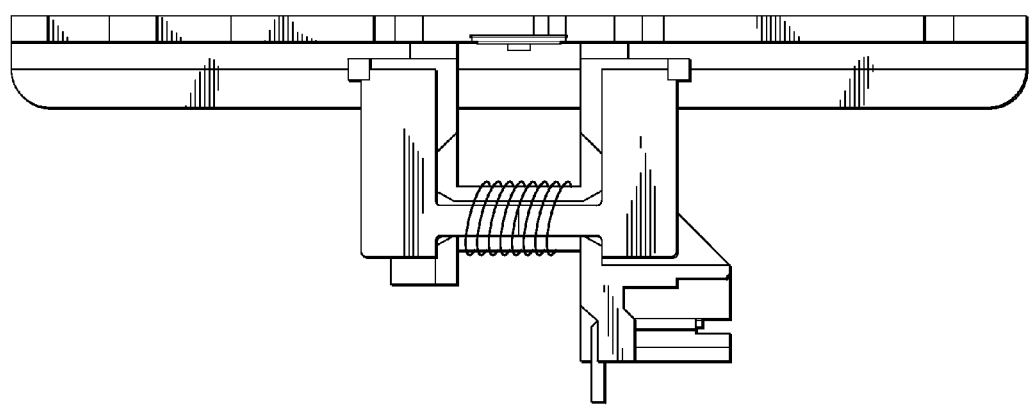
Figure 7A:
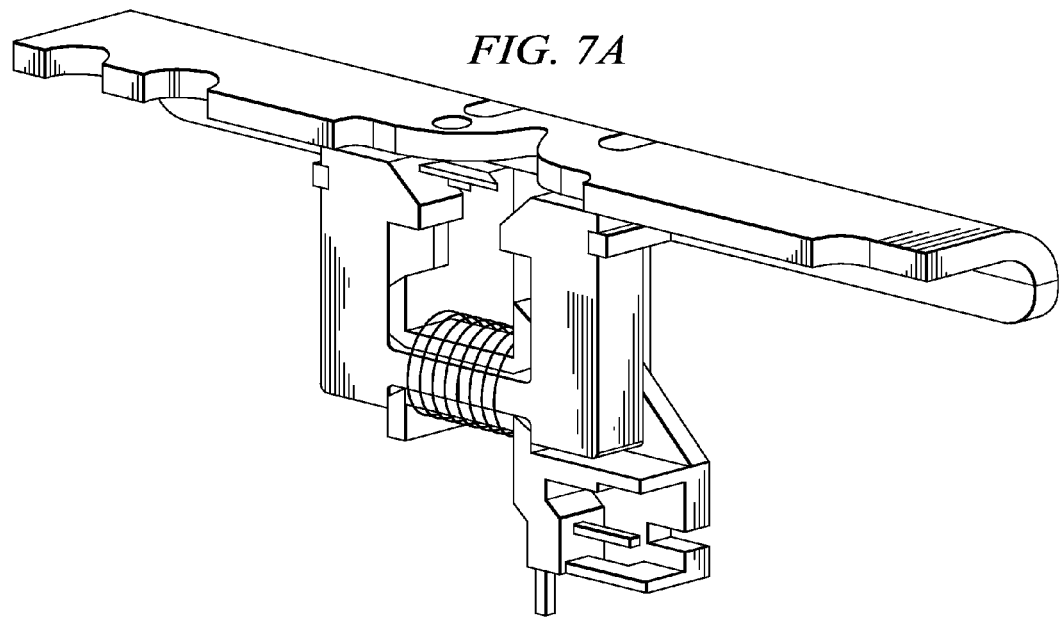
FIGS. 7A and 7B show a front view and a perspective view of yet another embodiment of the invention.
Figure 7B:
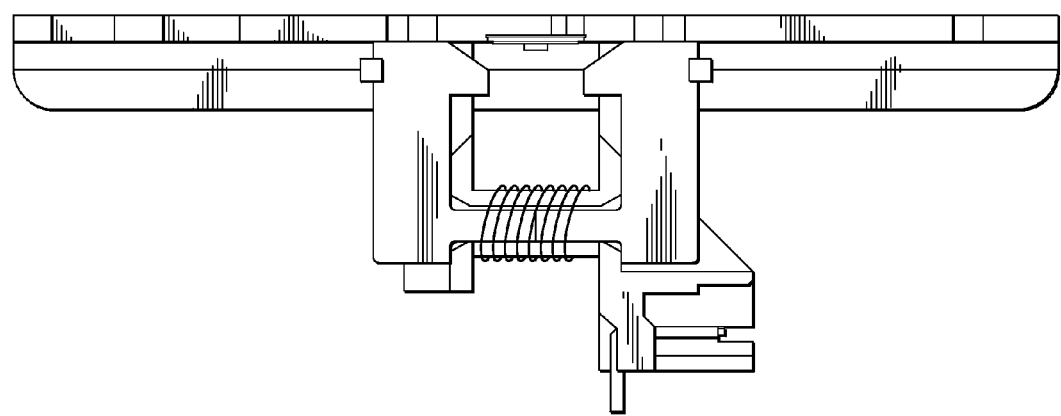

Referring now to FIG. 1, there is illustrated a simplified system diagram of a torsional hinged pivoting device that will benefit from the teachings of the present invention. The illustrated system is a laser printer using a resonant torsional hinged mirror as the printer "drive engine". As shown, the printer system comprises a resonant scanning device 10, which in the illustrative embodiment is a mirror. The scanning device 10 is driven by the application of a drive torque to the pivoting device, such as the scanning device or mirror 10. Although various techniques or drive mechanisms 12 may be used to generate the drive torque, one particularly suitable drive technique, to be discussed in detail hereinafter, is the interaction of a permanent magnet mounted to the back side of the operational of the mirror 10 with an adjacent electromagnetic coil (12b) as shown in detail in FIGS. 6A and 6B.

As will be appreciated by those skilled in the art, a laser printer includes a light beam 14 from source 16 that is directed toward the reflective surface of rotating mirror 10. The rotating mirror 10 oscillates or rotates back and forth as indicated by double headed arrow 18 to produce a sweeping beam of light indicated at 14a, 14b, and 14n on a photosensitive medium 20, such as a photosensitive drum. Also included is an optical beam sensor and preferably a pair of optical beam sensors 22a and 22b that provide a signal pulse through wire pairs 24a and 24b each time the reflected light beam 14a-14n passes over the optical beam sensor or sensors fixed at a known location. The signal pulse on wire pairs 24a and 24b are provided to monitor and control circuitry 26, which uses the signals to determine the necessary parameters (for example start time and duration) of a drive pulse to stabilize and maintain the rotation amplitude of the mirror rotation. If the drive mechanism 12 is magnetic, then in the illustrated example, a power source is monitored and control circuitry 26 will generate a drive pulse in response to the determined parameters that is provided through connecting wires 28 to a magnetic coil.

Figure 2:
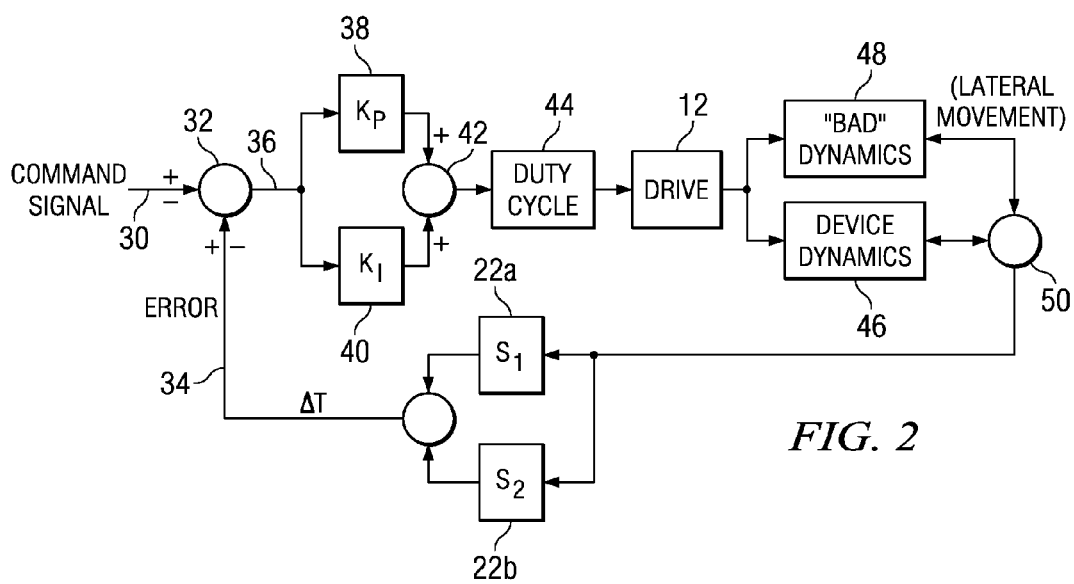
FIG. 2 illustrates a block diagram of a drive and feedback circuit suitable for use in the system of FIG. 1.

As was discussed above, monitor and control circuitry 26 receives signal pulses from sensors 22a and 22b and uses these pulses to maintain the oscillating device at the correct rotational amplitude. Referring now to FIG. 2, there is a block diagram of a functional closed loop schematic of such a stabilized feedback or monitor and control circuitry. As shown, a base drive command or signal that maintains a desired oscillation frequency and amplitude is periodically provided on input 30. The base drive signal on input 30 is a default value for a known frequency and known detector location. The base signal is combined at node 32 with an error signal input on line 34, which represents a time deviation from the expected timing of the pulses from beam detectors 22a and 22b. The resulting signal on line 36 is provided to proportional correction ($K_p$) circuitry 38 and integral correction ($K_I$) circuitry 40. The output of the $K_p$ and $K_I$ circuits are then combined at node 42 and sent to duty cycle circuitry 44, which receives the corrected signal and changes the duty cycle as necessary to correct the velocity profile of the oscillating device (e.g. a mirror). Although other parameters could be changed to correct the velocity profile of the oscillating device, if a permanent magnet-magnetic coil driving arrangement is used to provide torque to the assembly, changing the duty cycle or duration of a constant amplitude drive pulse has been found to be particularly effective. Thus as shown, a drive pulse having a known start time, and a duty cycle responsive to changes in the velocity profile of the oscillating device is provided to the drive mechanism 12, which according to one embodiment is an electromagnet coil. Thus in a perfect world, and as a result of the dynamics of the resonant torsional hinged device indicated by box 46, the resonant device would continue to operate at the known resonant frequency and at a repeatable speed or velocity profile so long as the base drive pulse on line 30 is provided to the electromagnet coil. Unfortunately as discussed above, other factors such as air currents and vibrations, etc. apply undesirable forces on the torsional hinged device that cause scan direction variations or jitter in the movement or velocity profile of the torsional hinged device. This scan direction motion is represented by the box 48 labeled "bad" dynamics. Therefore, as shown at node 50, the combination of the device dynamics represented by box 46 and the "bad" dynamics 48 result in a change in the velocity profile or the time that the pulses are due to be generated by sensors 22a and 22b. However, these scan direction changes due to the "bad" dynamics may also result in scan direction movement at a different frequency than the feed back loop is designed for. Therefore, although the feedback loop may normally correctly compensate for changes, reflected or alliased data signals may also fall in regions of the control band width of the feedback loop. This alliased data signal may then cause changes in the drive signal that exacerbates the scan direction jitter problem rather than reducing or attenuating the problem.

Figure 3A:
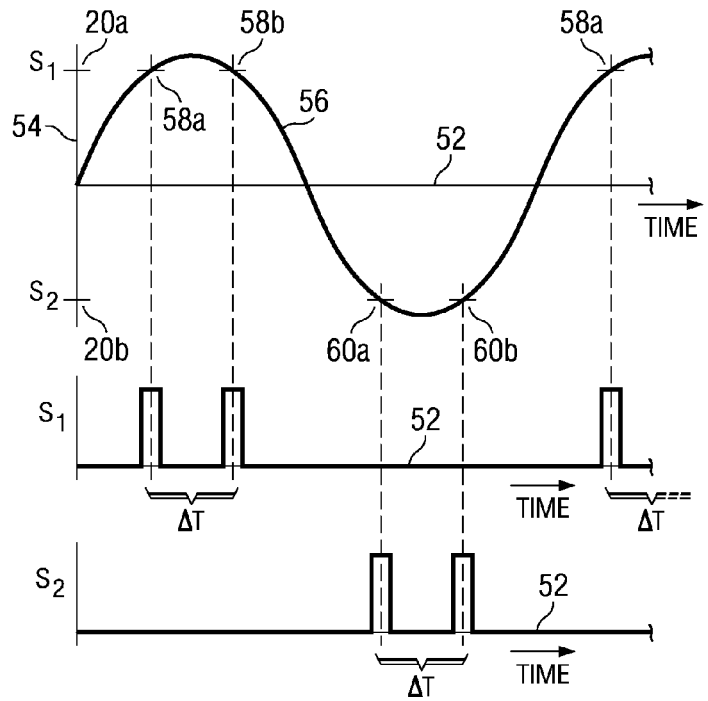
FIGS. 3A, 3B, and 3C are graphs showing the angle or position of an oscillating torsional hinged device and the signals produced by a pair of sensors used for feedback in the system of FIG. 1.
Figure 3B:
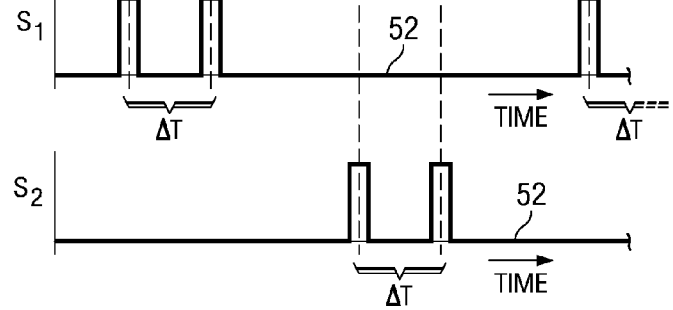
Figure 3C:
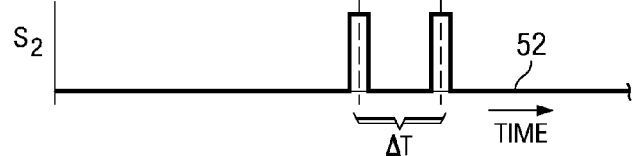

FIGS. 3A, 3B, and 3C help illustrate this issue. Each of FIGS. 3A-3C show time as the horizontal axis 52 of the graph. The vertical axis 54 of FIG. 3A represents the rotational angle of the oscillating device. Therefore as shown, the curve 56 in FIG. 3A illustrates how the angle of the resonant torsional hinged device varies with time. The vertical axis 54 of FIG. 3A also illustrates angular positions of the light beam at which sensor 22a and sensor 22b will generate a pulse. Thus for each peak (maximum and minimum) of the sinusoidal curve 56 representing the angular position of the oscillating device, there are a pair of pulses generated by sensors 20a and 20b respectively as indicated by reference numbers (58a-58b) and (60a-60b). FIG. 3B illustrates the pulses generated by sensor 20a and FIG. 3C illustrates the pulses generate by sensor 20b.

Figure 4B:
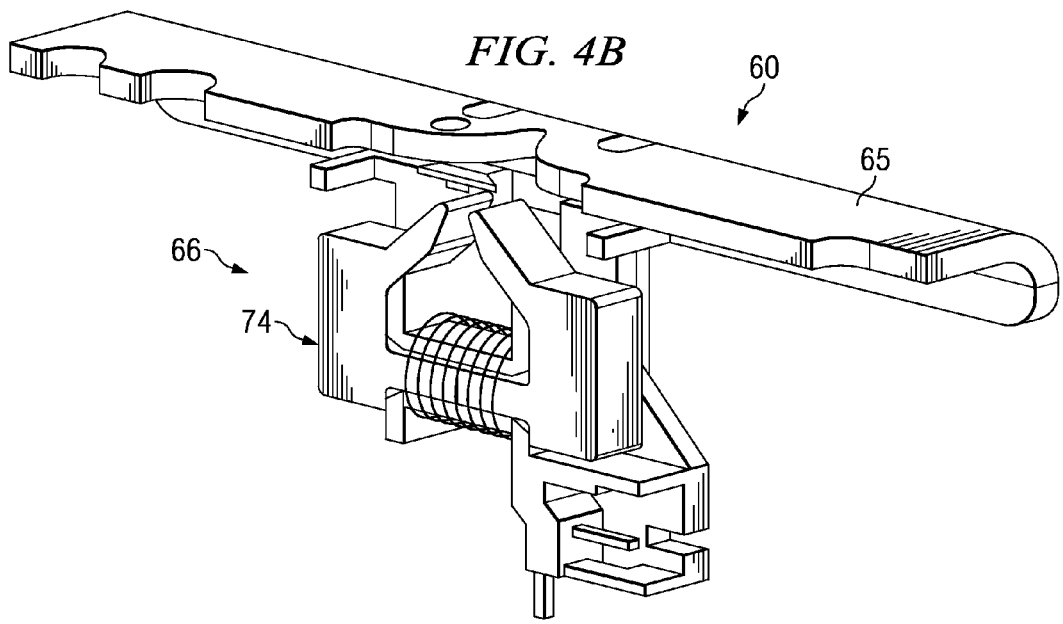

Referring now to FIGS. 4A and 4B, there is shown a front view and a partial perspective view of a presently available power efficient torsional hinged oscillating system 60 comprising a torsional hinged mirror 62 having a permanent magnet 64 mounted to the back side of the torsional hinged mirror 62. The torsional hinged or pivoting mirror structure 62 is anchored to a support structure 65 adjacent a drive mechanism 66, a coil 68 of the drive mechanism 66 receives periodic energy pulses that generate a magnetic field represented by flux lines 70 that interacts with permanent magnet 64 and provides rotational torque to pivot the mirror assembly 62 about pivot axis 72. The flux line field 70 is guided by the magnetic core 74, which includes the horizontal portions of the core 76a and vertical portion 76b. Also included are arms 78a and 78b, which end or terminate at tips 88a and 88b. As will be appreciated by those skilled in the art, the magnetic field will be substantially contained by the core material 76a, 76b, 78a, and 78b. However, to complete the magnetic circuit, the field lines must extend across the air gap between tips 80a and 80b. As indicated by flux lines 70, the magnetic field rapidly diverges and forms curved field gradients once they leave the metal core and start to traverse the air gap. The interaction of the non-uniform magnetic field, represented by the curved flux lines, with the permanent magnet 64 provides robust magnetic forces that cause rotation torque to be applied to the mirror structures. However, these magnetic forces also include non-rotational components that create vibration and other non-rotational or lateral cross scan direction movement of the pivoting device. Also, the close proximity of the core tips 80a and 80b to the rotating mirror decreases its damping coefficient and increases low frequency amplitude variations. Further, as shown, there are substantial support structures and drive mechanism structures surrounding or adjacent to the pivoting device. Consequently, the pivoting device creates air currents that interact with these structures and cause density fluctuations and variations in air drag that also results in rotational amplitude variations, vibration, and non-rotational movement. It is these undesirable and unintended non-rotational motion and vibrations that are eliminated or substantially reduced by the present invention.

Figure 5:
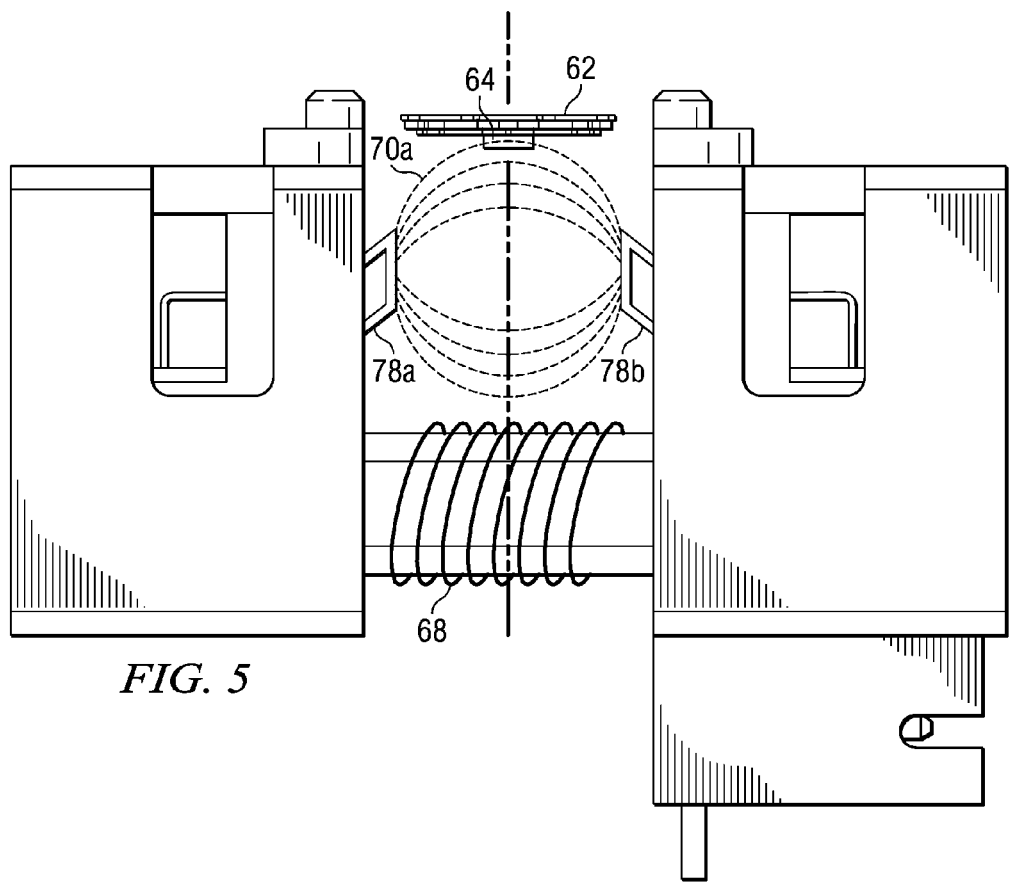
FIG. 5 is a resonant scanning mirror and drive mechanism arrangement similar to FIG. 4A, but modified according to the teachings of a first embodiment of the present invention.

According to a first embodiment, the structure of FIG. 5A is substantially the same as that shown in FIGS. 4A and 4B except the tips 80a and 80b as well as a portion of the arms 78a and 78b have been removed from the magnetic core. Consequently, the magnetic force field represented by flux lines 70a does not provide nearly the drive force as the drive mechanism of FIGS. 4A and 4B. However, those portions of the field that interact with permanent magnet 64 are substantially more uniform and do not include the gradients as did the field produced by the structure of FIGS. 4A and 4B. Thus, although less drive energy is available, there are also fewer and less powerful non-rotational forces applied to the pivoting device. Furthermore, removing portions of the core arms 78a, 78b, and core tips 80a and 80b results in less air density fluctuations, air drag, and vibrations due to air current formed by these adjacent structures.

FIGS. 6A, 6B, 7A, and 7B illustrate two additional embodiments employing magnetic drive and magnetic core designs according to the teachings of the present invention.

It will also be appreciated that other types of drive mechanisms, including drive mechanisms that apply inertia vibrations to the anchors of the torsional hinges may be used with the invention. For example, piezoelectric stacks may be used to generate rotational motion of the device.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A torsional hinged scanning system comprising:
   an oscillating structure comprising a resonant pivoting device having a known maximum Q value and supported by a pair of torsional hinges lying along a pivot axis; a support structure connected to said torsional hinges; and a drive mechanism responsive to a drive signal for oscillating said pivoting device about said pivoting axis according to a selected velocity profile, said resonant pivoting device spaced from said support structure and said drive mechanism structure to reduce air drag so as to maintain the Q value of said resonant pivoting device within 1% of said maximum Q value of said resonant pivoting devices;
   a sensing device for sensing the rotational position of said pivoting device and generating signals representative of said sensed position;
   control circuitry connected to receive said signals representative of said sensed position and for determining the parameters of said drive signal necessary to maintain said velocity profile; and
   circuitry connected to said control circuitry for generating said drive signal having said determined parameters.

2. The system of claim 1 wherein said drive mechanism comprises a permanent magnet mounted to said oscillating assembly and an electromagnetic coil that produces flux lines that interact with said permanent magnet to create rotational torque on said oscillating assembly, and wherein said drive signal is a periodic voltage pulse of a selected duration applied to said electromagnet coil.

3. The system of claim 2 further comprising a magnetic core having a pair of truncated arms for guiding magnetic flux lines generated by said electromagnetic coil toward said permanent magnet mounted on said oscillating device.

4. The system of claim 3 wherein said drive mechanism applies substantially only a rotational torque to said pivoting device.

5. The system of claim 1 wherein said oscillating assembly is a torsional hinged mirror.

6. The system of claim 3 wherein the magnetic flux lines acting on said permanent magnet are substantially uniform.

7. The system of claim 1 wherein said drive mechanism applies substantially only a rotational torque to said pivoting device.

8. A method for stabilizing the rotational motion of a torsional hinged device comprising the steps of:
  supporting a pivoting device supported by torsional hinges lying along a pivot axis that extends to hinge anchors;
  determining the maximum "Q" of said pivoting device;
  attaching said hinge anchors to a support structure such that said pivoting device is spaced from said support structure;
  spacing a drive mechanism from said pivoting device for providing a drive torque to said pivoting device;
  oscillating said pivoting device about said pivot axis according to a selected velocity profile in response to a drive signal;
  said spacing of said pivoting device from said support structures and said drive mechanism for preventing air drag so that the "Q" of said pivoting device is not reduced more than about 1% from said determined maximum Q;
  sensing the rotational position of said oscillating device and generating a signal representative of said position;
  receiving said generated signal to compute the drive signal required to maintain said velocity profile; and
  generating said drive signal.

9. The method of claim 8 wherein said oscillations of said device results from the interaction of at least one permanent magnet mounted on said oscillating device and an electromagnetic coil receiving a drive signal.

10. The method of claim 8 wherein said provided drive torque is substantially only a rotational torque.

11. The method of claim 10 wherein said electromagnetic coil generates a magnetic field and said generated magnetic field is substantially uniform in the region substantially near the magnet.

12. The method of claim 10 wherein said drive mechanism applies inertial vibrations to the anchors of said torsional hinges.

13. The method of claim 12 wherein said step of providing a drive mechanism comprises providing a piezoelectric drive mechanism.

* * * * *